(12) United States Patent
Kim

(10) Patent No.: US 8,102,907 B2
(45) Date of Patent: Jan. 24, 2012

(54) SPACE-FREQUENCY EQUALIZATION FOR OVERSAMPLED RECEIVED SIGNALS

(75) Inventor: Byoung-Hoon Kim, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1091 days.

(21) Appl. No.: 11/410,850

(22) Filed: Apr. 24, 2006

(65) Prior Publication Data

US 2008/0219341 A1    Sep. 11, 2008

Related U.S. Application Data

(60) Provisional application No. 60/676,586, filed on Apr. 28, 2005.

(51) Int. Cl.
*H03H 7/30* (2006.01)
(52) U.S. Cl. ........ 375/232; 375/267; 375/233; 375/355; 375/148; 370/480; 370/317; 370/419; 370/210
(58) Field of Classification Search .................. 375/267, 375/233, 355, 148, 295, 238, 232, 350; 370/332, 370/310, 480, 317, 419, 210
See application file for complete search history.

(56) References Cited

U.S. PATENT DOCUMENTS

| | | | | |
|---|---|---|---|---|
| 6,563,841 | B1* | 5/2003 | Nedic et al. .................... | 370/480 |
| 7,133,477 | B2* | 11/2006 | Yellin et al. .................... | 375/349 |
| 7,151,573 | B2* | 12/2006 | Kim et al. ...................... | 348/607 |
| 2005/0128966 | A1* | 6/2005 | Yee ................................ | 370/310 |
| 2006/0280257 | A1* | 12/2006 | Kim ............................... | 375/267 |

OTHER PUBLICATIONS

W. A. Gardner, "Cyclic wiener filtering: Theory and method," IEEE Trans. Commun., vol. 41, No. 1, pp. 151-163, Jan. 1993.
W. A. Gardner and C. W. Reed, "Making the most out of spectral redundancy in GSM," 38th Asilomar Conf. Signals, Systems and Computers, vol. 1, pp. 883-889, 2001.
P. Li and K. B. Letaif, "Space-frequency filtering for multicarrier CDMA systems," VTC 2001-Fall, vol. 2, pp. 943-947, Oct. 2001.
A. Burg, M. Rupp, S.Haene, D. Perels, N. Felber, and W. Fichtner, "Low complexity frequency domain equalization of MIMO channels with applications to MIMO-CDMA systems," VTC 2003-Fall, vol. 1, pp. 468-472, Oct. 2003.
Martin V Clark: "Adaptive Frequency-Domain Equalization and Diversity Combining for Broadband Wireless Communications." IEEE Journal on Selected Areas in Communications, IEEE Service Center, Piscataway, US, vol. 16, No. 8, Oct. 1998, pp. 1385-1395.

(Continued)

*Primary Examiner* — Eva Puente
(74) *Attorney, Agent, or Firm* — Rupit Patel; Charles E. Eggers

(57) ABSTRACT

Techniques for performing space-frequency equalization and spatial equalization in the frequency domain are described. Space-frequency equalization combines signal components across both space and frequency dimensions whereas spatial equalization combines signal components across space. A receiver obtains input symbols for multiple (M) signal copies from multiple (R) receive antennas and multiple (C) times oversampling, where M is equal to R times C. For space-frequency equalization, the receiver derives equalizer coefficients for the M signal copies, e.g., based on MMSE criterion, filters, the input symbols for the M signal copies with the equalizer coefficients, and combines the filtered symbols for the M signal copies to obtain output symbols. Space-frequency equalization may be used for some frequency bins and spatial equalization may be used for other frequency bins to reduce complexity.

40 Claims, 7 Drawing Sheets

OTHER PUBLICATIONS

Jae-Ho Ryu et al. "Comparison of Two FFT Structures for Fractionally-Spaced Frequency Domain Equalizer." VTC Spring 2002. IEEE 55th. Vehicular Technology Conference. Proceedings. Birmingham, AL, May 6-9, 2002, IEEE Vehicular Technology Conference, New York, NY: IEEE, US, vol. 1 of 4. Conf. 55, May 6, 2002, pp. 1710-1713.

Huemer M. et al. "Frequency Domain Equalization of Multiple FIR Channels Using Oversampling and/or Multiple Antennas." 2000 European Conference on Wireless Technology Conference Proceedings. ECWT 2000. Paris, Oct. 5-6, 2000, European Conference on Wireless Technology. ECWT, London: CMP, GB, Oct. 5, 2000, pp. 203-206.

International Preliminary Report on Patentability—PCT/US06/016061—The International Bureau WIPO, Geneva, Switzerland—Oct. 30, 2007.

International Search Report—PCT/US06/016061—International Search Authority, European Patent Office—Sep. 6, 2006.

Written Opinion—PCT/US06/016061—International Search Authority, European Patent Office—Sep. 6, 2006.

* cited by examiner

SPACE-FREQUENCY EQUALIZATION FOR OVERSAMPLED RECEIVED SIGNALS

I. CLAIM OF PRIORITY UNDER 35 U.S.C. §119

The present Application for Patent claims priority to Provisional Application Ser. No. 60/676,586, entitled "METHOD AND APPARATUS FOR FREQUENCY DOMAIN EQUALIZATION IN WIRELESS COMMUNICATIONS," filed Apr. 28, 2005, assigned to the assignee hereof, and expressly incorporated herein by reference.

BACKGROUND

I. Field

The present disclosure relates generally to communication, and more specifically to techniques for performing equalization at a receiver in a communication system.

II. Background

In a communication system, a transmitter typically processes (e.g., encodes, interleaves, symbol maps, spreads, and scrambles) traffic data to generate a sequence of chips. The transmitter then processes the chip sequence to generate a radio frequency (RF) signal and transmits the RF signal via a communication channel. The communication channel distorts the transmitted RF signal with a channel response and further degrades the signal with noise and interference from other transmitters.

A receiver receives the transmitted RF signal and processes the received RF signal to obtain samples. The receiver may perform equalization on the samples to obtain estimates of the chips sent by the transmitter. The receiver then processes (e.g., descrambles, despreads, demodulates, deinterleaves, and decodes) the chip estimates to obtain decoded data. The equalization performed by the receiver typically has a large impact on the quality of the chip estimates as well as the overall performance.

There is therefore a need in the art for techniques to perform equalization in a manner to achieve good performance.

SUMMARY

Techniques for performing space-frequency equalization and spatial equalization in the frequency domain are described herein. Space-frequency equalization combines signal components across both space and frequency dimensions whereas spatial equalization combines signal components across space.

According to an embodiment of the invention, an apparatus is described which includes at least one processor and a memory. The processor(s) derive equalizer coefficients for multiple signal copies (or spectral copies) from multiple receive antennas and oversampling. The processor(s) then filter input symbols for the multiple signal copies with the equalizer coefficients to obtain output symbols.

According to another embodiment, a method is provided in which equalizer coefficients are derived for multiple signal copies from multiple receive antennas and oversampling. Input symbols for the multiple signal copies are filtered with the equalizer coefficients.

According to yet another embodiment, an apparatus is described which includes means for deriving equalizer coefficients for multiple signal copies from multiple receive antennas and oversampling. The apparatus further includes means for filtering input symbols for the multiple signal copies with the equalizer coefficients.

According to yet another embodiment, an apparatus is described which includes at least one processor and a memory. The processor(s) obtain input symbols for multiple (M) signal copies from multiple (R) receive antennas and multiple (C) times oversampling, where M is equal to R times C. The processor(s) derive equalizer coefficients for the M signal copies, filter the input symbols for the M signal copies with the equalizer coefficients, and combine filtered symbols for the M signal copies to obtain output symbols.

According to yet another embodiment, a method is provided in which input symbols are obtained for M signal copies from R receive antennas and C times oversampling. Equalizer coefficients are derived for the M signal copies. The input symbols for the M signal copies are filtered with the equalizer coefficients. The filtered symbols for the M signal copies are combined to obtain output symbols.

According to yet another embodiment, an apparatus is described which includes means for obtaining input symbols for M signal copies from R receive antennas and C times oversampling, means for deriving equalizer coefficients for the M signal copies, means for filtering the input symbols for the M signal copies with the equalizer coefficients, and means for combining filtered symbols for the M signal copies.

According to yet another embodiment, an apparatus is described which includes at least one processor and a memory. The processor(s) implement at least one space-frequency equalizer and at least one spatial equalizer. Each space-frequency equalizer combines signal components across spatial and frequency dimensions. Each spatial equalizer combines signal components across spatial dimension.

According to yet another embodiment, a method is provided in which signal components are combined across spatial and frequency dimensions for a first set of at least one frequency bin. Signal components are combined across spatial dimension for a second set of at least one frequency bin.

According to yet another embodiment, an apparatus is described which includes means for combining signal components across spatial and frequency dimensions for a first set of at least one frequency bin, and means for combining signal components across spatial dimension for a second set of at least one frequency bin.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

For clarity, the following nomenclature is used for much of the description below. Time-domain scalars are denoted by lower case text with index n for sample period, e.g., h(n). Frequency-domain scalars are denoted by upper case text with index k for frequency bin, e.g., H(k). Vectors are denoted by bolded lower case text, e.g., h, and matrices are denoted by bolded upper case text, e.g., $\overline{\mathbf{H}}$.

Figure 1:
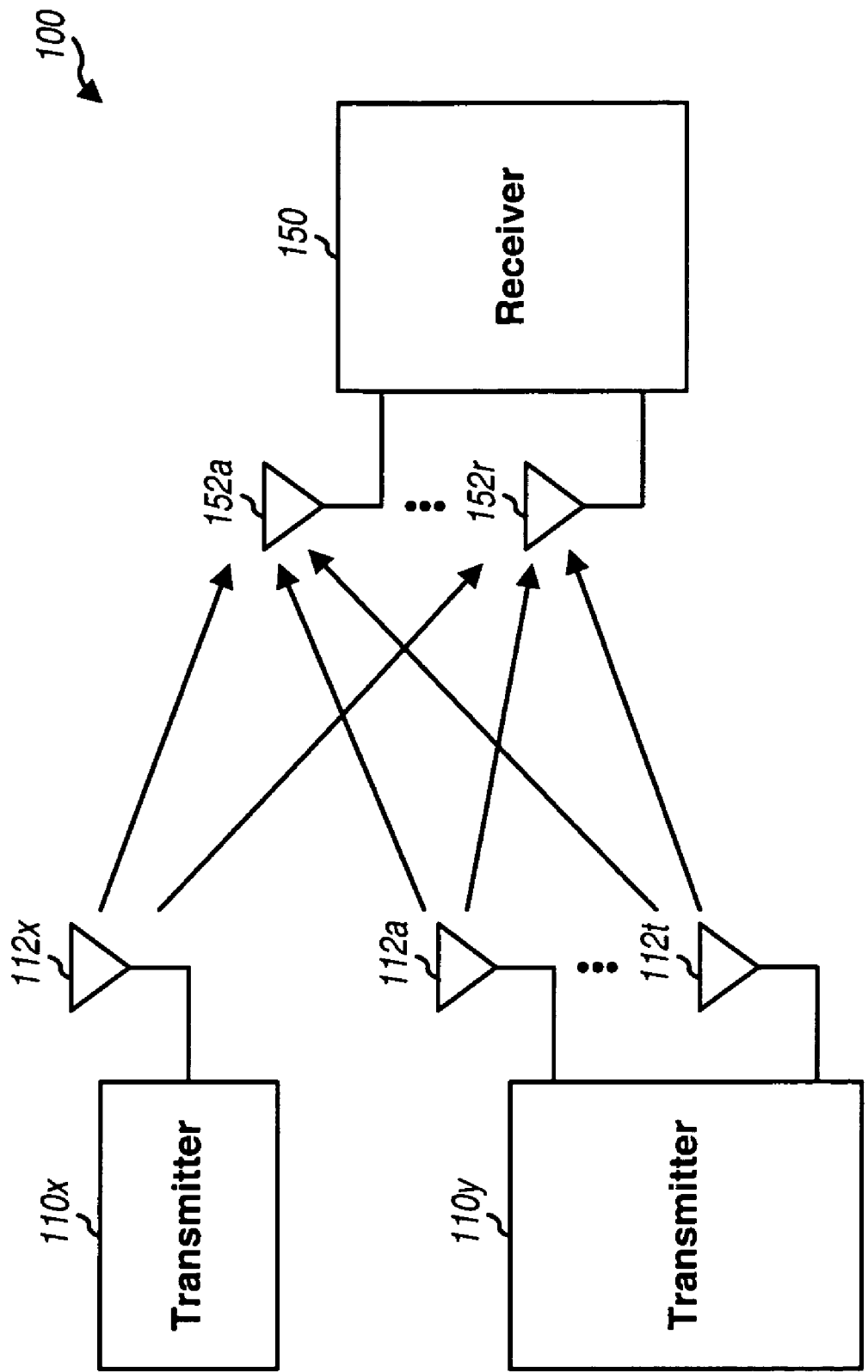
FIG. 1 shows two transmitters and a receiver in a communication system.

FIG. 1 shows a communication system 100 with two transmitters 110x and 110y and a receiver 150. Transmitter 110x is equipped with a single antenna 112x, transmitter 110y is equipped with multiple (T) antennas 112a through 112t, and receiver 150 is equipped with multiple (R) antennas 152a through 152r. A single-input multiple-output (SIMO) channel is formed by the single antenna at transmitter 110x and the R antennas at receiver 150. A multiple-input multiple-output (MIMO) channel is formed by the T antennas at transmitter 110y and the R antennas at receiver 150. For both transmitters 110x and 110y, a single-input single-output (SISO) channel exists between each transmit/receive antenna pair. The SISO channel may be characterized by a time-domain channel impulse response h(n) or a frequency-domain channel frequency response H(k).

A time-domain representation may be converted to a frequency-domain representation with a K-point fast Fourier transform (FFT) or a K-point discrete Fourier transform (DFT), which may be expressed as:

$$H(k) = \sum_{n=1}^{K} h(n) \cdot e^{-j2\pi(k-1)(n-1)/K}, \quad \text{Eq (1)}$$

where the "−1" in the exponent is due to indices n and k starting with 1 instead of 0.

A frequency-domain representation may be converted to a time-domain representation with a K-point inverse FFT (IFFT) or a K-point inverse DFT (IDFT), which may be expressed as:

$$h(n) = \frac{1}{K} \cdot \sum_{k=1}^{K} H(k) \cdot e^{j2\pi(k-1)(n-1)/K}. \quad \text{Eq (2)}$$

Figure 2:
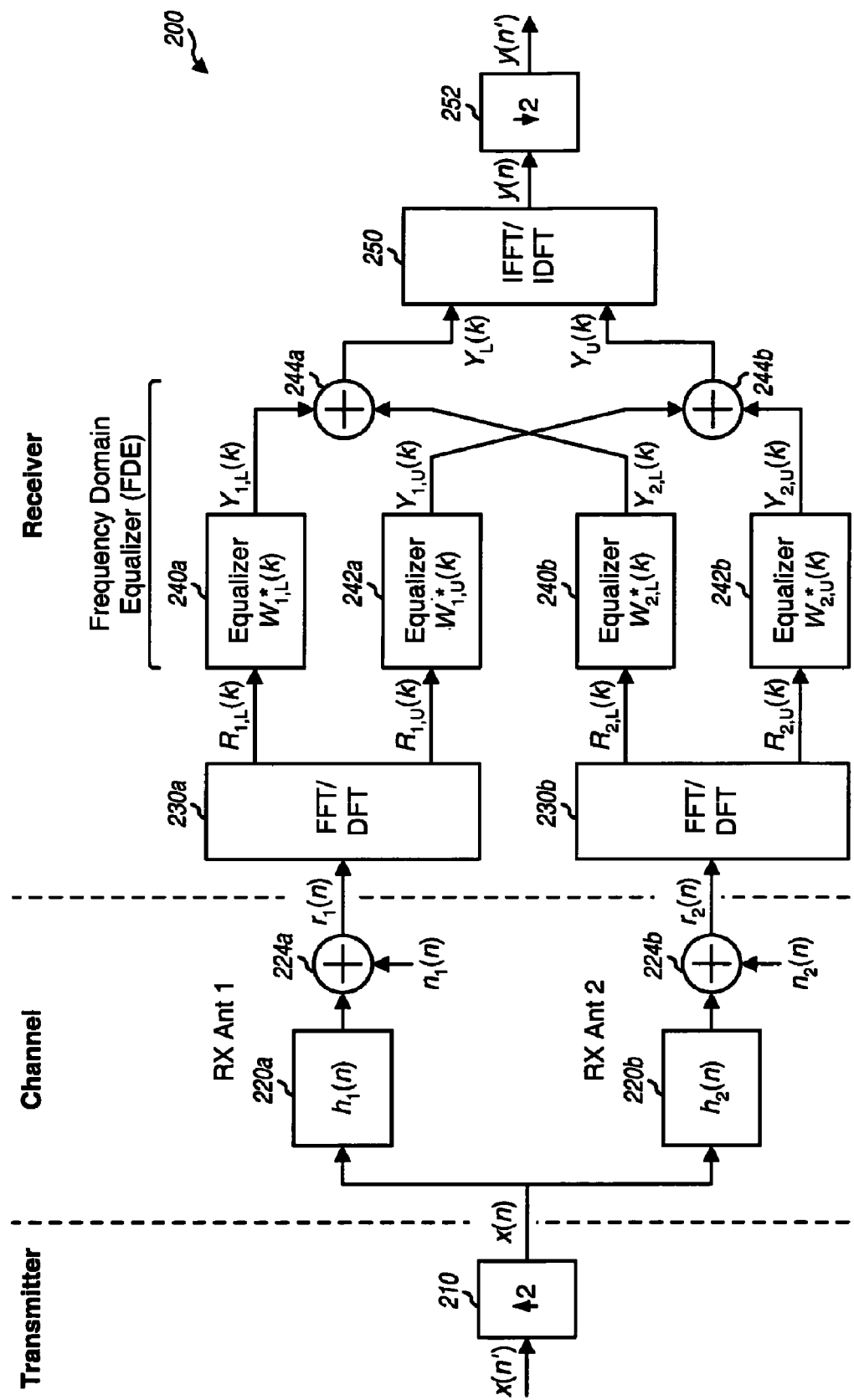
FIG. 2 shows transmission from a single-antenna transmitter to the receiver.

FIG. 2 shows a signal flow 200 for data transmission from single-antenna transmitter 110x to multi-antenna receiver 150. Receiver 150 utilizes receive diversity, which is reception of a single data stream with multiple receive antennas. For simplicity, FIG. 2 shows a case with two antennas at receiver 150 and two times (2×) oversampling of the received signal from each receive antenna. FIG. 2 shows the use of a fractionally-spaced frequency domain equalizer (FDE), which performs equalization in the frequency domain. The term "fractionally-spaced" refers to sampling at a higher rate than the rate required by Nyquist sampling theorem.

Transmitter 110x processes traffic data and generates transmit chips x(n') at chip rate, where n' is an index for chip period. The transmitter may append a cyclic prefix to each block of K/2 transmit chips. The cyclic prefix is a repeated portion of the data block and is used to combat intersymbol interference caused by frequency selective fading, which is a frequency response that is not flat across the system bandwidth. In an actual system, the transmitter sends the transmit chip sequence to the receiver. For signal flow 200, an upsampler 210 inserts a zero after each transmit chip and generates transmit samples x(n) at sample rate, which is twice the chip rate for 2× oversampling, where n is an index for sample period.

The transmit samples are sent from the single transmit antenna and via the SIMO channel to the two receive antennas. The SISO channel for the first receive antenna is modeled by a channel impulse response of $h_1(n)$ in block 220a and additive noise of $n_1(n)$ via a summer 224a. The SISO channel for the second receive antenna is modeled by a channel impulse response of $h_2(n)$ in block 220b and additive noise of $n_2(n)$ via a summer 224b. The channel impulse response $h_r(n)$ for each receive antenna r, for r=1, 2, includes the effects of any pulse shaping filter at the transmitter, the propagation channel, any front-end filter at the receiver, and so on.

Figure 4A:
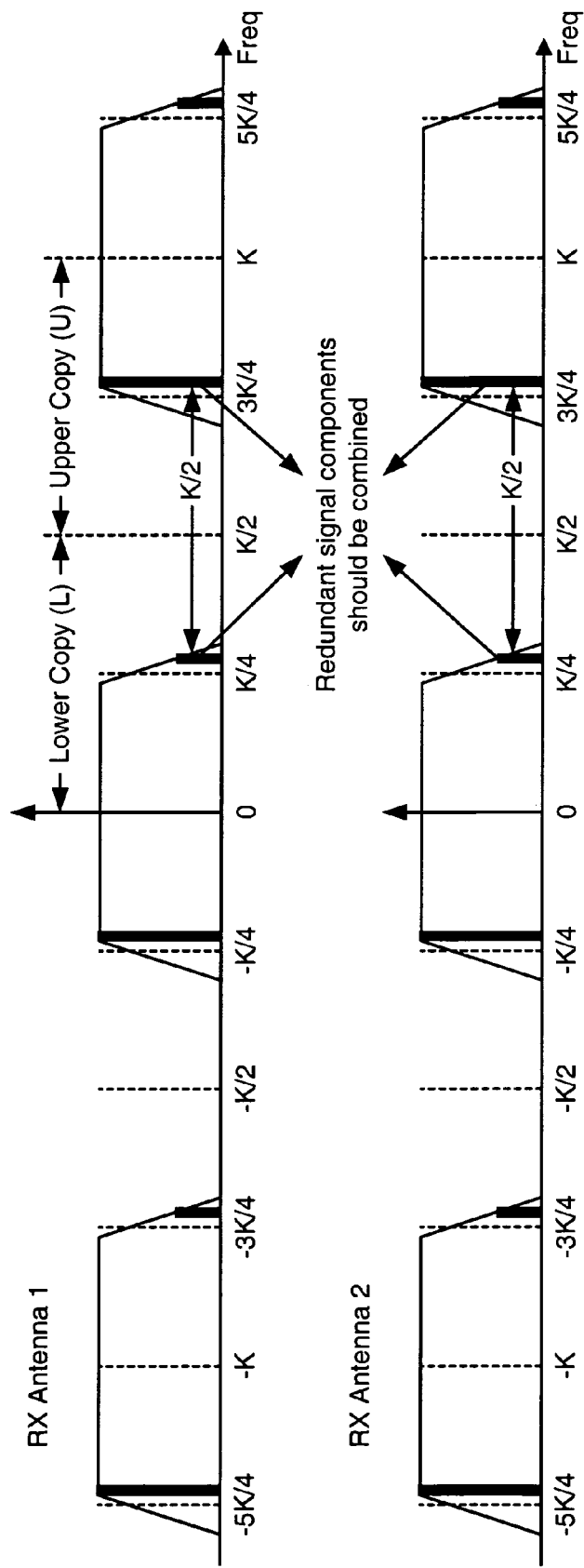
FIG. 4A shows spectral plots for two receive antennas with 2× oversampling.

Receiver 150 digitizes the received signal from each receive antenna at twice the chip rate and obtains input samples at the sample rate (not shown in FIG. 2). The receiver may remove the cyclic prefix, if any, appended in each data block by the transmitter. The time-domain input samples $r_1(n)$ from the first receive antenna are transformed to the frequency domain with a K-point FFT/DFT by a unit 230a to obtain frequency-domain input symbols $R_1(k)$, for k=1, ..., K. The 2× oversampling results in two copies of the signal spectrum being available for each receiver antenna, as shown in FIG. 4A. The two redundant signal copies in the oversampled spectrum for each receive antenna are denoted as a lower copy (L) and an upper copy (U). A signal copy may also be referred to as a spectral copy or by some other terminology. The first K/2 input symbols $R_1(k)$, for k=1, ..., K/2, are denoted as symbols $R_{1,L}(k)$, for k=1, ..., K/2, for the lower copy and are provided to an equalizer 240a. The last K/2 input symbols $R_1(k)$, for k=K/2+1, ..., K, are denoted as symbols $R_{1,U}(k)$, for k=1, ..., K/2, for the upper copy and are provided to an equalizer 242a.

Similarly, the time-domain input samples $r_2(n)$ from the second receive antenna are transformed to the frequency domain with a K-point FFT/DFT by a unit 230b to obtain frequency-domain input symbols $R_2(k)$, for k=, ..., K. The first K/2 input symbols $R_2(k)$, for k=1, ..., K/2, are denoted as symbols $R_{2,L}(k)$, for k=1, ..., K/2, for the lower copy and are provided to an equalizer 240b. The last K/2 input symbols $R_2(k)$, for k=K/2+1 ..., K, are denoted as symbols $R_{2,U}(k)$, for k=1, ..., K/2, for the upper copy and are provided to an equalizer 242b.

Equalizer 240a filters its input symbols $R_{1,L}(k)$ with its coefficients $W_{1,L}{}^*(k)$ and provides filtered symbols $Y_{1,L}(k)$, where "*" denotes a complex conjugate. Equalizer 242a filters its input symbols $R_{1,U}(k)$ with its coefficients $W_{1,U}{}^*(k)$ and provides filtered symbols $Y_{1,U}(k)$. Equalizer 240b filters its input symbols $R_{2,L}(k)$ with its coefficients $W_{2,L}{}^*(k)$ and provides filtered symbols $Y_{2,L}(k)$. Equalizer 242b filters its input symbols $R_{2,U}(k)$ with its coefficients $W_{1,U}(k)$ and provides filtered symbols $Y_{2,U}(k)$. A summer 244a sums the filtered symbols $Y_{1,L}(k)$ and $Y_{2,L}(k)$ from equalizers 240a and 240b, respectively, and provides output symbols $Y_L(k)$ for the lower copy. A summer 244b sums the filtered symbols $Y_{1,U}(k)$ and $Y_{2,U}(k)$ from equalizers 242a and 242b, respectively, and provides output symbols $Y_U(k)$ for the upper copy. A unit 250 performs a K-point IFFT/IDFT on output symbols $Y_L(k)$ and $Y_U(k)$ and provides output samples y(n) at the sample rate. A downsampler 252 discards every other output sample and provides output samples y(n') at the chip rate. The output samples y(n') are further processed to obtain decoded data.

Figure 3:
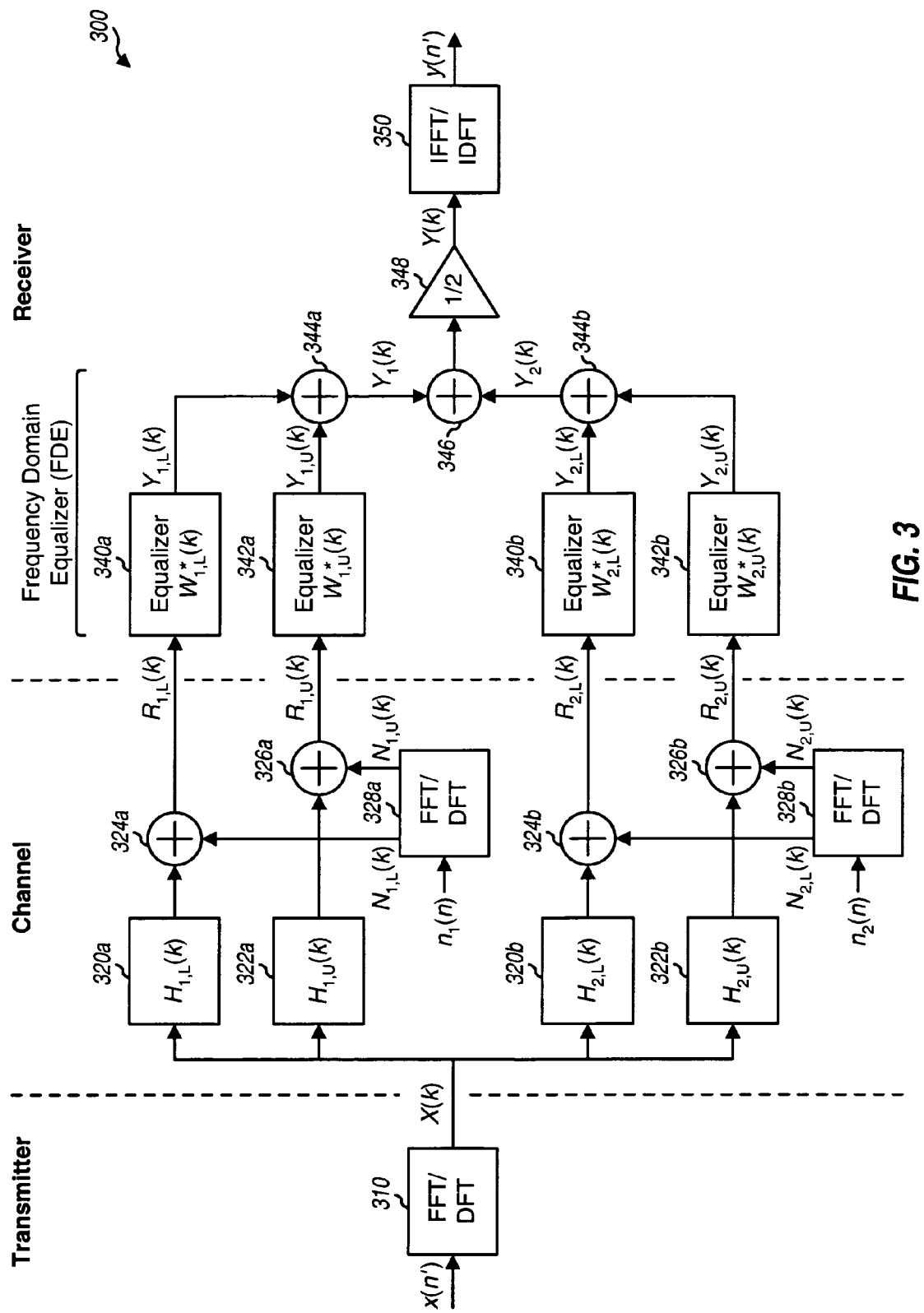
FIG. 3 shows a signal flow for a frequency domain equalizer for receive diversity.

FIG. 3 shows a frequency-domain signal flow 300 for a fractionally-spaced FDE for receive diversity. Signal flow 300 is equivalent to signal flow 200 in FIG. 2 and is also for the case with two receive antennas and 2× oversampling.

Transmitter 110x processes traffic data and generates transmit chips x(n'). In an actual system, the transmitter sends the transmit chip sequence to the receiver and does not perform any FFT/DFT. However, for signal flow 300, a unit 310 performs a K/2-point FFT/DFT on the transmit chips x(n') and provides frequency-domain transmit symbols X(k), for k=1, . . . , K/2. The transmit symbols X(k) are sent from the single transmit antenna and via the SIMO channel to the two receive antennas. The SISO channel for the first receive antenna is modeled by (1) a frequency response of $H_{1,L}(k)$ in block 320a and additive noise of $N_{1,L}(k)$ via a summer 324a for the lower copy and (2) a frequency response of $H_{1,U}(k)$ in block 322a and additive noise of $N_{1,U}(k)$ via a summer 326a for the upper copy. A unit 328a transforms time-domain noise $n_1(n)$ and provides frequency-domain noise $N_{1,L}(k)$ and $N_{1,U}(k)$. Similarly, the SISO channel for the second receive antenna is modeled by (1) a frequency response of $H_{2,L}(k)$ in block 320b and additive noise of $N_{2,L}(k)$ via a summer 324b for the lower copy and (2) a frequency response of $H_{2,U}(k)$ in block 322b and additive noise of $N_{2,U}(k)$ via a summer 326b for the upper copy. A unit 328b transforms time-domain noise $n_2(n)$ and provides frequency-domain noise $N_{2,L}(k)$ and $N_{2,U}(k)$. As shown in FIG. 3, the transmit symbols X(k) are sent via all four blocks 320a, 320b, 322a and 322b.

At receiver 150, an equalizer 340a receives frequency-domain input symbols $R_{1,L}(k)$ from summer 324a, filters the input symbols with its coefficients $W_{1,L}^*(k)$, and provides filtered symbols $Y_{1,L}(k)$. An equalizer 342a receives input symbols $R_{1,U}(k)$ from summer 326a, filters the input symbols with its coefficients $W_{1,U}^*(k)$, and provides filtered symbols $Y_{1,U}(k)$. An equalizer 340b receives input symbols $R_{2,L}(k)$ from summer 324b, filters the input symbols with its coefficients $W_{2,L}^*(k)$, and provides filtered symbols $Y_{2,L}(k)$. An equalizer 342b receives input symbols $R_{2,U}(k)$ from summer 326b, filters the input symbols with its coefficients $W_{2,U}^*(k)$, and provides filtered symbols $Y_{2,U}(k)$.

A summer 344a sums the filtered symbols $Y_{1,L}(k)$ and $Y_{1,U}(k)$ from equalizers 340a and 342a, respectively, and provides filtered symbols $Y_1(k)$ for the first receive antenna. A summer 344b sums the filtered symbols $Y_{2,L}(k)$ and $Y_{2,U}(k)$ from equalizers 340b and 342b, respectively, and provides filtered symbols $Y_2(k)$ for the second receive antenna. A summer 346 sums the filtered symbols $Y_1(k)$ and $Y_2(k)$. A gain element 348 scales the output of summer 346 with a gain of ½ and provides output symbols Y(k). A unit 350 performs a K/2-point IFFT/IDFT on the output symbols Y(k) and provides time-domain output samples y(n') at the chip rate.

In comparing signal flows 200 and 300, the 2× upsampling of x(n') by upsampler 210 in FIG. 2 followed by a K-point FFT/DFT is equivalent to performing a K/2-point FFT/DFT on x(n') by unit 310 in FIG. 3 and duplicating X(k) for the lower and upper copies of the oversampled spectrum. The series of operations of adding $Y_{1,L}(k)$ and $Y_{2,L}(k)$ by summer 244a, adding $Y_{1,U}(k)$ and $Y_{2,U}(k)$ by summer 244b, performing a K-point IFFT/IDFT by unit 250, and decimation by a factor of two by decimator 252 in FIG. 2 is equivalent to adding $Y_{1,L}(k)$ and $Y_{1,U}(k)$ by summer 344a, adding $Y_{2,L}(k)$ and $Y_{2,U}(k)$ by summer 344b, adding $Y_1(k)$ and $Y_2(k)$ by summer 346, scaling by ½ with unit 348, and performing a K/2-point IFFT/IDFT by unit 350 in FIG. 3. In FIG. 3, summers 344a and 344b perform spectral summations and summer 346 performs spatial summation. The spectral and spatial summations may also be performed in other manners. For example, in FIG. 3, $Y_{1,L}(k)$ and $Y_{2,L}(k)$ may be summed to obtain $Y_L(k)$ (which corresponds to the output of summer 244a in FIG. 2), $Y_{1,U}(k)$ and $Y_{2,U}(k)$ may be summed to obtain $Y_U(k)$ (which corresponds to the output of summer 244b in FIG. 2), and $Y_L(k)$ and $Y_U(k)$ may be summed and scaled by ½ to obtain Y(k).

FIG. 4A shows exemplary spectral plots for the two receive antennas with 2× oversampling. The data chips x(n') are at the chip rate of $f_c$. The corresponding spectrum has a single-sided bandwidth of $f_c/2$ or, equivalently, a double-sided bandwidth of $f_c$, and a roll-off determined by the pulse shaping filter at the transmitter. The received signal from each receive antenna is digitized at the sample rate of $f_s$, which is twice the chip rate, or $f_s=2f_c$. For each receive antenna, the lower copy covers a frequency range of DC to $f_s/2$, which corresponds to bin indices k=1 through K/2, and the upper copy covers a frequency range of $f_s/2$ to $f_s$, which corresponds to bin indices k=K/2+1 through K. For simplicity, FIG. 4A shows similar spectral plots for the two receive antennas. In general, the spectral plot for each receive antenna r has a shape determined by the frequency response $H_r(k)$ for that antenna. The spectral plots for the two receive antennas may be different if $H_1(k)$ is not equal to $H_2(k)$, which is normally the case and is exploited for receive diversity.

As shown in FIG. 4A, the receiver obtains four signal copies from a redundancy factor of two from the two receive antennas and another redundancy factor of two from the 2× oversampling. FIG. 4A also shows how four redundant signal components in the four signal copies should be combined. The two redundant signal components for each receive antennas are separated by a distance of $f_s/2$ or K/2 frequency bins.

As shown in FIG. 4A, a space-frequency equalizer may be used for each frequency bin k, for k=1, . . . , K/2. The space-frequency equalizer for frequency bin k may combine the redundant signal components on bins k and k+K/2 for both receive antennas. K/2 space-frequency equalizers may be used for the K/2 frequency bins. For clarity, the processing for one frequency bin k is described below. The same processing may be performed for each of the K/2 frequency bins, or for k=1, . . . , K/2.

For a SIMO transmission from transmitter 110x to receiver 150, the frequency-domain input symbols at the receiver may be expressed as:

$$\underline{r}(k)=\underline{h}(k)\cdot X(k)+\underline{n}(k), \quad \text{Eq (3)}$$

where $\underline{r}(k)=[R_{1,L}(k)\ R_{2,L}(k)\ R_{1,U}(k)\ R_{2,U}(k)]^T$ is a 4×1 vector of input symbols,
$\underline{h}(k)=[H_{1,L}(k)\ H_{2,L}(k)\ H_{1,U}(k)\ H_{2,U}(k)]^T$ is a 4×1 vector of channel gains,
$\underline{n}(k)=[N_{1,L}(k)\ N_{2,L}(k)\ N_{1,U}(k)\ N_{2,U}(k)]^T$ is a 4×1 vector of noise, and
"T" denotes a transpose.

The upper and lower signal copies for each receive antenna are denoted by subscripts U and L, respectively, and are separated by K/2 frequency bins, as shown in FIG. 4A.

The frequency-domain output symbols from the FDE may be expressed as:

$$\begin{aligned} Y(k) &= \underline{w}^H(k)\cdot \underline{r}(k), \\ &= \underline{w}^H(k)\cdot \underline{h}(k)\cdot X(k) + \underline{w}^H(k)\cdot \underline{n}(k), \\ &= B(k)\cdot X(k) + V(k), \end{aligned} \quad \text{Eq (4)}$$

where $\underline{w}^H(k)=[W_{1,L}^*(k)/2\ W_{2,L}^*(k)/2\ W_{1,U}^*(k)/2\ W_{2,U}^*(k)/2]$ is a 4×1 row vector of equalizer coefficients for frequency bin k, B(k)=$w^H(k) \cdot h(k)$ is a scaling for X(k),
V(k)=$\underline{w}^H(k) \cdot \underline{n}(k)$ is filtered noise for X(k), and
"$^H$" denotes a conjugate transpose.
In equation (4), the equalizer coefficients $w^H(k)$ include the scaling factor of ½ for gain element 348 in FIG. 3.

The equalizer coefficients may be derived based on a minimum mean square error (MMSE) technique, a zero-forcing (ZF) technique, a maximal ratio combining (MRC) technique, and so on. For the MMSE technique, the equalizer coefficients satisfy the following condition:

$$\min_{\underline{w}^H(k)} E\{|\underline{w}^H(k) \cdot \underline{r}(k) - X(k)|^2\}, \qquad \text{Eq (5)}$$

where E{ } is an expectation operation. Equation (5) minimizes the mean square error between the FDE output Y(k) and the transmitted symbols X(k).

The MMSE solution to equation (5) may be expressed as:

$$\underline{w}^H(k) = S(k) \cdot \underline{h}^H(k) \cdot [S(k) \cdot \underline{h}(k) \cdot \underline{h}^H(k) + \underline{R}(k)]^{-1}, \qquad \text{Eq (6)}$$

where $S(k) = E\{|X(k)|^2\}$ is the power spectrum of transmit chips x(n'), and
$\underline{R}(k) = E\{\underline{n}(k) \cdot \underline{n}^H(k)\}$ is a 4×4 noise covariance matrix.

The matrix inversion lemma may be applied to equation (6). The equalizer coefficients may then be expressed as:

$$\underline{w}^H(k) = \frac{S(k)}{1 + S(k) \cdot \underline{h}^H(k) \cdot \underline{R}^{-1}(k) \cdot \underline{h}(k)} \cdot \underline{h}^H(k) \cdot \underline{R}^{-1}(k). \qquad \text{Eq (7)}$$

Equation (7) has a 4×4 matrix inversion for $\underline{R}^{-1}(k)$ for each frequency bin k. Equation (7) may be simplified as described below.

In a first simplification scheme, which may be used if the lower and upper copies of the oversampled spectrum have uncorrelated noise or negligible noise correlation, the noise covariance matrix has the following block diagonal form:

$$\underline{R}(k) = \begin{bmatrix} \underline{R}_L(k) & 0 \\ 0 & \underline{R}_U(k) \end{bmatrix}, \qquad \text{Eq (8)}$$

where $$\underline{R}_c(k) = \begin{bmatrix} \sigma_{1,c}^2(k) & \sigma_{1,c}(k) \cdot \sigma_{2,c}(k) \cdot \rho_c(k) \\ \sigma_{1,c}(k) \cdot \sigma_{2,c}(k) \cdot \rho_c^*(k) & \sigma_{2,c}^2(k) \end{bmatrix};$$

$\sigma_{r,c}^2(k) = E\{|N_{r,c}(k)|^2\}$ is the variance of the noise for copy c from antenna r, $$\rho_c(k) = \frac{E\{N_{1,c}(k) \cdot N_{2,c}^*(k)\}}{\sigma_{1,c}(k) \cdot \sigma_{2,c}(k)}$$

is the noise correlation between the two receive antennas,
c∈{L, U} is an index for the lower and upper copies, and
r∈{1,2} is an index for the two receive antennas.
$\underline{R}_c(k)$ is a 2×2 noise covariance matrix for the two receive antennas for one frequency bin k in signal copy c. The simplification in equation (8) may also be made if the correlation between the two receive antennas is negligible but the noise components in the lower and upper copies are spectrally correlated. In this case, the 4×1 vectors for equation (3) may be reordered to obtain the block diagonal matrix shown in equation (8).

With R(k) defined as shown in equation (8), the equalizer coefficients in $w^H(k)$ may be expressed as:

$$\frac{W_{r,c}^*(k)}{2} = \frac{S(k) \cdot [\underline{h}_c^H(k) \cdot \underline{R}_c^{-1}(k)]_r}{D(k)}, \text{ for } r = 1, 2 \text{ and } c = L, U, \qquad \text{Eq (9)}$$

where $\underline{h}_c(k) = [H_{1,c}(k) \ H_{2,c}(k)]^T$ is a 2×1 vector of channel gains for bin k of copy c, $$[\underline{h}_c^H(k) \cdot \underline{R}_c^{-1}(k)]_1 = \frac{H_{1,c}^*(k) \cdot \sigma_{2,c}^2(k) - H_{2,c}^*(k) \cdot \rho_c^*(k) \cdot \sigma_{1,c}(k) \cdot \sigma_{2,c}(k)}{\sigma_{1,c}^2(k) \cdot \sigma_{2,c}^2(k) \cdot (1 - |\rho_c(k)|^2)},$$

$$[\underline{h}_c^H(k) \cdot \underline{R}_c^{-1}(k)]_2 = \frac{H_{2,c}^*(k) \cdot \sigma_{1,c}^2(k) - H_{1,c}^*(k) \cdot \rho_c^*(k) \cdot \sigma_{1,c}(k) \cdot \sigma_{2,c}(k)}{\sigma_{1,c}^2(k) \cdot \sigma_{2,c}^2(k) \cdot (1 - |\rho_c(k)|^2)}, \text{ and}$$

$$D(k) = 1 + S(k) \cdot [\underline{h}_L^H(k) \cdot \underline{R}_L^{-1}(k) \cdot \underline{h}_L(k) + \underline{h}_U^H(k) \cdot \underline{R}_U^{-1}(k) \cdot \underline{h}_U(k)].$$

The components of D(k) may be expanded as follows:

$$\underline{h}_c^H(k) \cdot \underline{R}_c^{-1}(k) \cdot \underline{h}_c(k) = \frac{\begin{pmatrix} |H_{1,c}(k)|^2 \sigma_{2,c}^2(k) + |H_{2,c}(k)|^2 \sigma_{1,c}^2(k) - \\ 2\text{Re}\{H_{1,c}^*(k) H_{2,c}(k) \rho_c(k)\} \cdot \sigma_{1,c}(k) \sigma_{2,c}(k) \end{pmatrix}}{(\sigma_{1,c}^2(k) \cdot \sigma_{2,c}^2(k) \cdot (1 - |\rho_c(k)|^2))}.$$

In a second simplification scheme, which may be used if the noise is spatially and spectrally uncorrelated and has a spatially and spectrally equal noise variance, the noise covariance matrix R(k) has the following form:

$$\underline{R}(k) = \sigma^2(k) \cdot \underline{I}, \qquad \text{Eq (10)}$$

where $\sigma_{1,L}^2(k) = \sigma_{2,L}^2(k) = \sigma_{1,U}^2(k) = \sigma_{2,U}^2(k) = \sigma^2(k)$ is the noise variance,
$\rho_L(k) = \rho_U(k) = 0$, and
$\underline{I}$ is an identity matrix.

With R(k) defined as shown in equation (10), the equalizer coefficients in $w^H(k)$ may be expressed as:

$$\frac{W_{r,c}^*(k)}{2} = \frac{S(k) \cdot H_{r,c}^*(k)}{S(k) \cdot \|\underline{h}(k)\| + \sigma^2(k)}, \text{ for } r = 1, 2 \text{ and } c = L, U, \qquad \text{Eq (11)}$$

where $\|\underline{h}(k)\| = |H_{1,L}(k)|^2 + |H_{2,L}(k)|^2 + |H_{1,U}(k)|^2 + |H_{2,U}(k)|^2$. $\|\underline{h}(k)\|$ is the norm of the channel response vector h(k) for bin k. As shown in equation (11), even though the noise is spatially and spectrally uncorrelated, the four equalizer coefficients $W_{1,L}^*(k)/2$, $W_{2,L}^*(k)/2$, $W_{1,U}^*(k)/2$ and $W_{2,U}^*(k)/2$ are jointly determined by the four spatially and spectrally separated channel gains $H_{1,L}(k)$, $H_{2,L}(k)$, $H_{1,U}(k)$ and $H_{2,U}(k)$.

In a third simplification scheme, which may be used if the noise components for the two receive antenna are uncorrelated so that $\rho_L(k) = \rho_U(k) = 0$ in equation (8), the noise covariance matrix R(k) has the following form:

$$\underline{R}(k) = \begin{bmatrix} \sigma_{1,L}^2(k) & 0 & 0 & 0 \\ 0 & \sigma_{2,L}^2(k) & 0 & 0 \\ 0 & 0 & \sigma_{1,U}^2(k) & 0 \\ 0 & 0 & 0 & \sigma_{2,U}^2(k) \end{bmatrix}. \quad \text{Eq (12)}$$

For the noise covariance matrix shown in equation (12), different noise variances may be obtained for different signal copies. The equalizer coefficients $\underline{w}^H(k)$ may be derived based on $\underline{R}(k)$ defined as shown in equation (12).

Other simplifications may also be made for other conditions. For example, the noise correlation between the two receive antennas may be frequency invariant, so that $\rho_L(k) = \rho_L$ and $\rho_U(k) = \rho_U$. The various simplifications may reduce computation for the equalizer coefficients over the computation shown in equation (7).

The signal-to-noise ratio (SNR) for the chip-rate output samples $y(n')$ may be expressed as:

$$SNR_{chip} = \frac{\sum_{k=1}^{K/2} S(k)}{\sum_{k=1}^{K/2} \{|F \cdot B(k) - 1|^2 \cdot S(k) + |F|^2 \cdot \sigma_V^2(k)\}}, \quad \text{Eq (13)}$$

where $\sigma_V^2(k) = E\{|V(k)|^2\} = \underline{w}^H(k) \cdot \underline{R}(k) \cdot \underline{w}(k)$ is the variance of $V(k)$, $$F = \left[ \frac{1}{K/2} \cdot \sum_{k=1}^{K/2} B(k) \right]^{-1}$$

is a scaling factor, and
$SNR_{chip}$ is the chip SNR for the output samples $y(n')$.

Equation (4) provides biased MMSE estimates of $X(k)$. The scaling factor F may be applied to either $Y(k)$ or $y(n')$ to obtain unbiased estimates of $X(k)$ or $x(n')$, respectively. If a data symbol is spread across M chips with a spreading code (e.g., a Walsh code or an OVSF code), then the symbol SNR for the data symbol may be obtained by multiplying the chip SNR with the spreading code length M.

The fractionally-spaced FDE described above for a SIMO transmission to two receive antennas may be extended to a SIMO transmission to any number of receive antennas. The FDE may also be extended to a MIMO transmission from multiple (T) transmit antennas to multiple (R) receive antennas. For clarity, the following description is for a 2×2 MIMO transmission with two transmit antennas, two receive antennas, and 2× oversampling.

For a MIMO transmission from transmitter 110y to receiver 150, the frequency-domain input symbols at the receiver may be expressed as:

$$\underline{r}(k) = \underline{h}_1(k) \cdot X_1(k) + \underline{h}_2(k) \cdot X_2(k) + \underline{n}(k), \quad \text{Eq (14)}$$

where $\underline{r}(k)$ is a 4×1 vector of input symbols,
$X_1(k)$ and $X_2(k)$ are symbols sent from transmit antennas 1 and 2, respectively,
$\underline{h}_1(k)$ is a 4×1 vector of channel gains for transmit antenna 1,
$\underline{h}_2(k)$ is a 4×1 vector of channel gains for transmit antenna 2, and
$\underline{n}(k)$ is a 4×1 vector of noise.

Vectors $\underline{r}(k)$, $\underline{h}_1(k)$, $\underline{h}_2(k)$ and $\underline{n}(k)$ have the form shown in equation (3).

Two vectors of equalizer coefficients, $\underline{w}_1^H(k)$ and $\underline{w}_2^H(k)$, may be derived to recover the two transmitted symbols $X_1(k)$ and $X_2(k)$, respectively, for each frequency bin k. The equalizer coefficient vectors may be derived based on the MMSE, zero-forcing, MRC, or some other technique.

The MMSE equalizer coefficients for each transmit antenna may be expressed as:

$$\underline{w}_t^H(k) = \frac{S_t(k)}{1 + S_t(k) \cdot \underline{h}_t^H(k) \cdot \underline{\Psi}_t^{-1}(k) \cdot \underline{h}_t(k)} \cdot \underline{h}_t^H(k) \cdot \underline{\Psi}_t^{-1}(k), \quad \text{Eq (15)}$$

$$\text{for } t = 1, 2,$$

where t is an index for the two transmit antennas,
$\underline{w}_t^H(k)$ is a 1×4 vector of equalizer coefficients for transmit antenna t,
$S_t(k) = E\{|X_t(k)|^2\}$ is the power spectrum of $x_t(n)$ sent from antenna t, and
$\underline{\Psi}_t(k)$ is a 4×4 noise and interference covariance matrix for transmit antenna t.

The noise and interference covariance matrices for the two transmit antennas may be expressed as:

$$\underline{\Psi}_1(k) = S_2(k) \cdot \underline{h}_2(k) \cdot \underline{h}_2^H(k) + \underline{R}(k), \quad \text{and Eq (16)}$$

$$\underline{\Psi}_2(k) = S_1(k) \cdot \underline{h}_1(k) \cdot \underline{h}_1^H(k) + \underline{R}(k).$$

Equation (16) indicates that the noise and interference covariance matrix $\underline{\Psi}_t(k)$ for transmit antenna t includes (1) the noise covariance matrix $\underline{R}(k)$ that is applicable for both transmit antennas and (2) the interference from the data stream sent from the other transmit antenna $\bar{t}$, which is $S_{\bar{t}}(k) \cdot \underline{h}_{\bar{t}}(k) \cdot \underline{h}_{\bar{t}}^H(k)$. The inter-stream interference is determined by the channel response vector $\underline{h}_{\bar{t}}(k)$ and the power spectrum $S_{\bar{t}}(k)$ for the other transmit antenna $\bar{t}$.

The simplifications described above for the SIMO transmission are generally not applicable for the MIMO transmission. This is because $\underline{\Psi}_t(k)$ includes the inter-stream interference from the other transmit antenna. Hence, even if $\underline{R}(k)$ is a diagonal matrix due to spatially and spectrally uncorrelated noise, the inter-stream interference is typically not a diagonal matrix. Hence, a matrix inversion may be performed to obtain $\underline{\Psi}_t^{-1}(k)$ for equation (15)

The equalizer coefficient vectors $\underline{w}_1^H(k)$ and $\underline{w}_2^H(k)$ may be applied to the input vector $\underline{r}(k)$ to obtain output symbols $Y_1(k)$ and $Y_2(k)$, respectively, which are estimates of the transmitted symbols $X_1(k)$ and $X_2(k)$, respectively. The frequency-domain output symbols from the FDE may be expressed as:

$$Y_t(k) = \underline{w}_t^H(k) \cdot \underline{r}(k) = B_t(k) \cdot X_t(k) + V_t(k), \text{ for } t=1,2, \quad \text{Eq (17)}$$

where $Y_t(k)$ is an estimate of $X_t(k)$ sent from transmit antenna t,
$B_t(k) = \underline{w}_t^H(k) \cdot \underline{h}_t(k)$ is a scaling factor for $X_t(k)$, and
$V_t(k) = \underline{w}_t^H(k) \cdot [\underline{h}_{\bar{t}}(k) \cdot X_{\bar{t}}(k) + \underline{n}(k)]$ is filtered noise and interference for $X_t(k)$.

The chip SNR for each transmit antenna may be expressed as:

$$SNR_{chip,t} = \frac{\sum_{k=1}^{K/2} S_t(k)}{\sum_{k=1}^{K/2} \{|F_t \cdot B_t(k) - 1|^2 \cdot S_t(k) + |F_t|^2 \cdot \sigma_{V,t}^2(k)\}}, \quad \text{Eq (18)}$$

where $\sigma_{V,t}^2(k) = E\{|V_t(k)|^2\} = \underline{w}_t^H(k) \cdot \underline{\Psi}_t(k) \cdot \underline{w}_t(k)$ is the variance of $V_t(k)$, $$F_t = \left[\frac{1}{K/2} \cdot \sum_{k=1}^{K/2} B_t(k)\right]^{-1}$$

is a scaling factor for transmit antenna t, and $SNR_{chip,t}$ is the chip SNR for transmit antenna t.

Equation (17) provides biased MMSE estimates of $X_t(k)$. The scaling factor $F_t$ may be applied to $Y_t(k)$ or $y_t(n')$ to obtain unbiased estimates of $X_t(k)$ or $x_t(n')$, respectively. If a data symbol is spread across M chips with a spreading code, then the symbol SNR for the data symbol may be obtained by multiplying the chip SNR with the spreading code length M.

A space-frequency equalizer structure may be used for a SIMO transmission or a MIMO transmission. A space-frequency equalizer combines redundant signal components on bins k and k+N/2 for all receive antennas, as described above. For the case with R=2 and 2× oversampling, a 4×4 matrix inversion for R(k) or $\Psi_t(k)$ may be performed for each equalizer coefficient vector $\overline{w}^H(k)$ or $w_t^H(k)$, respectively.

Referring to FIG. 4A, $\underline{h}_L(k) = [\overline{H}_{1,L}(k) H_{2,L}(k)]^T$ is non-zero for the passband and the transition band in the lower copy. Similarly, $\underline{h}_U(k) = [H_{1,U}(k) H_{2,U}(k)]^T$ is non-zero for the passband and the transition band in the upper copy. Either $\underline{h}_L(k)$ or $\underline{h}_U(k)$ is small or zero for frequency bins outside of the passband and transition band. Hence, for some frequency bins, there are only two redundant signal components (instead of four) to combine since the signal components at either k or k+K/2 are practically zero.

In an aspect, a combination of space-frequency equalizers and spatial equalizers is used for the K/2 frequency bins in order to reduce complexity. A space-frequency equalizer may be used for each frequency bin k in which there are non-negligible signal components on both bin k in the lower copy and bin k+K/2 in the upper copy. A spatial equalizer may be used for each frequency bin k in which there are signal components on only bin k in the lower copy or bin k+K/2 in the upper copy.

Figure 4B:
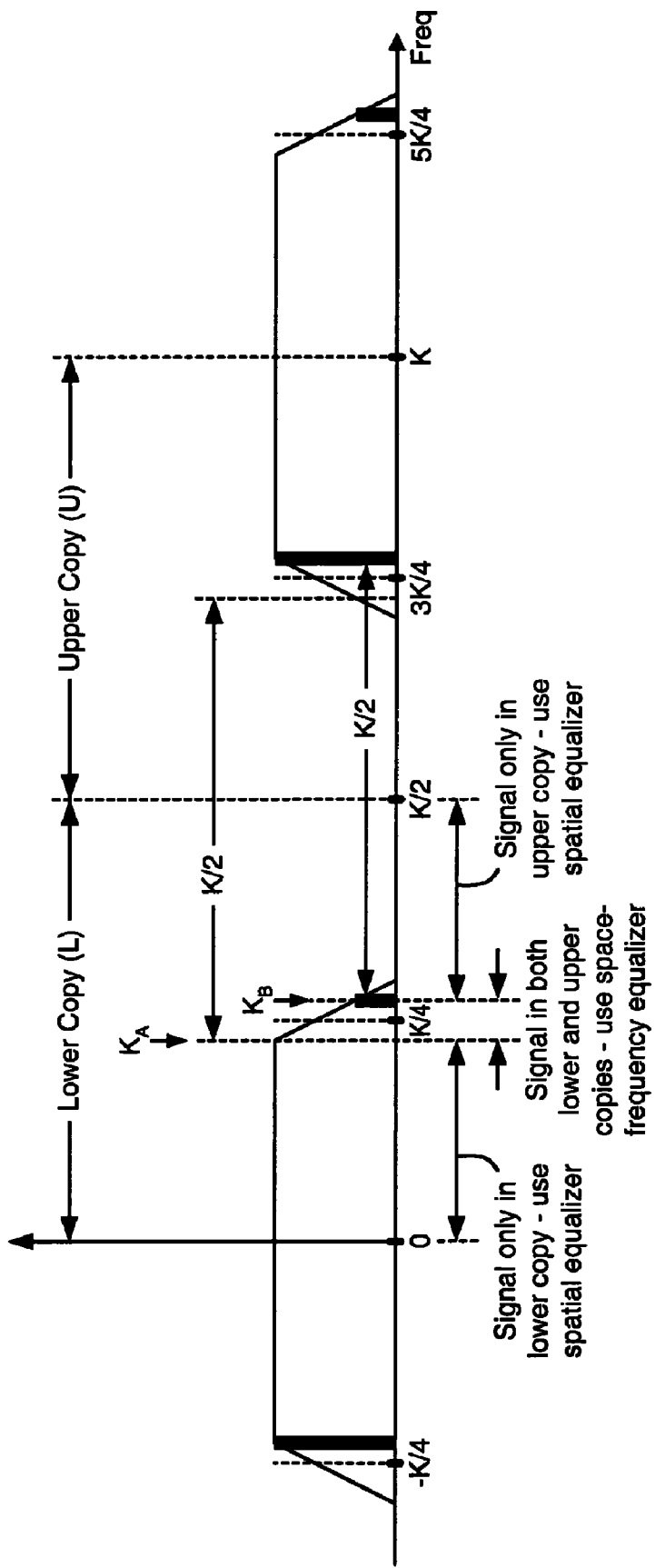
FIG. 4B shows spectral plots for two signal copies for one receive antenna.

FIG. 4B shows a spectral plot of two signal copies for one receive antenna. As shown in FIG. 4B, for each of frequency bins $1 \leq k \leq K_A$, the signal component on bin k+K/2 in the upper copy is small or zero, and a spatial equalizer may be used for each of these bins. For each of frequency bins $K_A < k \leq K_B$, the signal components on both bin k in the lower copy and bin k+K/2 in the upper copy are non-negligible, and a space-frequency equalizer may be used for each of these bins. For each of frequency bins $K_B < k \leq K/2$, the signal component on bin k in the lower copy is small or zero, and a spatial equalizer may be used for each of these bins. A 4×4 matrix inversion may be performed for each space-frequency equalizer if the simplifications described above are not applicable. A 2×2 matrix inversion may be performed for each spatial equalizer if the simplifications are not applicable. The use of both space-frequency equalizers and spatial equalizers generally reduces complexity without degradation in performance.

For a general case with T transmit antennas and R receive antennas, the channel response vectors for each transmit antenna t may be defined as follows:

$\underline{h}_{t,L}(k) = [H_{t,1,L}(k) H_{t,2,L}(k) \ldots H_{t,R,L}(k)]^T$ is an $R \times 1$ vector, $\underline{h}_{t,U}(k) = [H_{t,1,U}(k) H_{t,2,U}(k) \ldots H_{t,R,U}(k)]^T$ is an $R \times 1$ vector, and $\underline{h}_t(k) = [\underline{h}_{t,L}^T(k) \underline{h}_{t,U}^T(k)]^T$ is a $2R \times 1$ vector.

The noise vectors for the R receive antennas may be defined as follows:

$\underline{n}_L(k) = [N_{1,L}(k) N_{2,L}(k) \ldots N_{R,L}(k)]^T$ is an $R \times 1$ vector, $\underline{n}_U(k) = [N_{1,U}(k) N_{2,U}(k) \ldots N_{R,U}(k)]^T$ is an $R \times 1$ vector, and $\underline{n}(k) = [\underline{n}_L^T(k) \underline{n}_U^T(k)]^T$ is a $2R \times 1$ vector.

The noise covariance matrices may be defined as follows:

$\underline{R}_L(k) = E\{\underline{n}_L(k) \cdot \underline{n}_L^H(k)\}$ is an $R \times R$ matrix, $\underline{R}_U(k) = E\{\underline{n}_U(k) \cdot \underline{n}_U^H(k)\}$ is an $R \times R$ matrix, and $\underline{R}(k) = E\{\underline{n}(k) \cdot \underline{n}^H(k)\}$ is a $2R \times 2R$ matrix.

The noise and interference covariance matrices may be defined as follows:

$$\underline{\Psi}_{t,L}(k) = \sum_{i=1,i \neq t}^{T} S_i(k) \cdot \underline{h}_{i,L}(k) \cdot \underline{h}_{i,L}^H(k) + \underline{R}_L(k) \text{ is an } R \times R \text{ matrix},$$

$$\underline{\Psi}_{t,U}(k) = \sum_{i=1,i \neq t}^{T} S_i(k) \cdot \underline{h}_{i,U}(k) \cdot \underline{h}_{i,U}^H(k) + \underline{R}_U(k)$$

is an $R \times R$ matrix, and $$\underline{\Psi}_t(k) = \sum_{i=1,i \neq t}^{T} S_i(k) \cdot \underline{h}_i(k) \cdot \underline{h}_i^H(k) + \underline{R}(k) \text{ is a } 2R \times 2R \text{ matrix}.$$

The spatial equalizer for each of frequency bins 1 through $K_A$ may be expressed as:

$$\underline{w}_{sp,t}^H(k) = \frac{S_t(k)}{1 + S_t(k) \cdot \underline{h}_{t,L}^H(k) \cdot \underline{\Psi}_{t,L}^{-1}(k) \cdot \underline{h}_{t,L}(k)} \cdot \underline{h}_{t,L}^H(k) \cdot \underline{\Psi}_{t,L}^{-1}(k). \quad \text{Eq (19)}$$

The space-frequency equalizer for each of frequency bins $K_A + 1$ through $K_B$ may be expressed as:

$$\underline{w}_{sf,t}^H(k) = \frac{S_t(k)}{1 + S_t(k) \cdot \underline{h}_t^H(k) \cdot \underline{\Psi}_t^{-1}(k) \cdot \underline{h}_t(k)} \cdot \underline{h}_t^H(k) \cdot \underline{\Psi}_t^{-1}(k). \quad \text{Eq (20)}$$

The spatial equalizer for each of frequency bins $K_B + 1$ through K/2 may be expressed as:

$$\underline{w}_{sp,t}^H(k) = \frac{S_t(k)}{1 + S_t(k) \cdot \underline{h}_{t,U}^H(k) \cdot \underline{\Psi}_{t,U}^{-1}(k) \cdot \underline{h}_{t,U}(k)} \cdot \underline{h}_{t,U}^H(k) \cdot \underline{\Psi}_{t,U}^{-1}(k). \quad \text{Eq (21)}$$

The space-frequency equalizer coefficients $\underline{w}_{sf,t}^H(k)$ in equation (20) may be obtained with a 2R×2R matrix inversion. The spatial equalizer coefficients $\underline{w}_{sp,t}^H(k)$ in equation (19) or (21) may be obtained with an R×R matrix inversion. For R=2, the spatial equalizer coefficients may be derived based on a closed form solution instead of a 2×2 matrix inversion.

To further reduce complexity, a common noise and interference covariance matrix may be used for all T transmit antennas by applying the matrix inversion lemma. The equalizer coefficients in equations (19), (20) and (21) may then be expressed as:

$$\underline{w}_{sp,t}^H(k) = S_t(k) \cdot \underline{h}_{t,L}^H(k) \cdot \underline{\Psi}_L^{-1}(k), \text{ for } 1 \le k \le K_A, \quad \text{Eq (22)}$$

$$\underline{w}_{sf,t}^H(k) = S_t(k) \cdot \underline{h}_t^H(k) \cdot \underline{\Psi}^{-1}(k), \text{ for } K_A < k \le K_B, \text{ and} \quad \text{Eq (23)}$$

$$\underline{w}_{sp,t}^H(k) = S_t(k) \cdot \underline{h}_{t,U}^H(k) \cdot \underline{\Psi}_U^{-1}(k), \text{ for } K_B < k \le K/2, \quad \text{Eq (24)}$$

where $\underline{\Psi}_L(k) = \sum_{i=1}^{T} S_i(k) \cdot \underline{h}_{i,L}(k) \cdot \underline{h}_{i,L}^H(k) + \underline{R}_L(k),$ $\underline{\Psi}_U(k) = \sum_{i=1}^{T} S_i(k) \cdot \underline{h}_{i,U}(k) \cdot \underline{h}_{i,U}^H(k) + \underline{R}_U(k),$ and $\underline{\Psi}(k) = \sum_{i=1}^{T} S_i(k) \cdot \underline{h}_i(k) \cdot \underline{h}_i^H(k) + \underline{R}(k).$ In an embodiment, frequency bins $K_A$ and $K_B$ may be defined as:

$$K_A = (1 - \alpha + \epsilon) \cdot K/4 \text{ and} \quad \text{Eq (25)}$$

$$K_B = (1 + \alpha - \epsilon) \cdot K/4, \quad \text{Eq (26)}$$

where $\alpha$ is a roll-off factor for the pulse shaping filter at the transmitter, and $\epsilon$ is an equalizer selection threshold.

The roll-off factor may be specified by the system, e.g., $\alpha = 0.22$ for W-CDMA. The threshold $\epsilon$ determines whether to use space-frequency equalization or spatial equalization and may be defined as $0 \le \epsilon \le \alpha$. With $\epsilon = 0$, space-frequency equalizers are used for $\alpha \cdot K/2$ frequency bins, spatial equalizers are used for the remaining $(1-\alpha) \cdot K/2$ frequency bins, and significant reduction in complexity may be achieved without degradation in performance. As threshold $\epsilon$ increases, spatial equalizers are used for more frequency bins, complexity further reduces, but performance may start to degrade. Threshold $\epsilon$ may be selected based on a tradeoff between complexity and performance.

Figure 5:
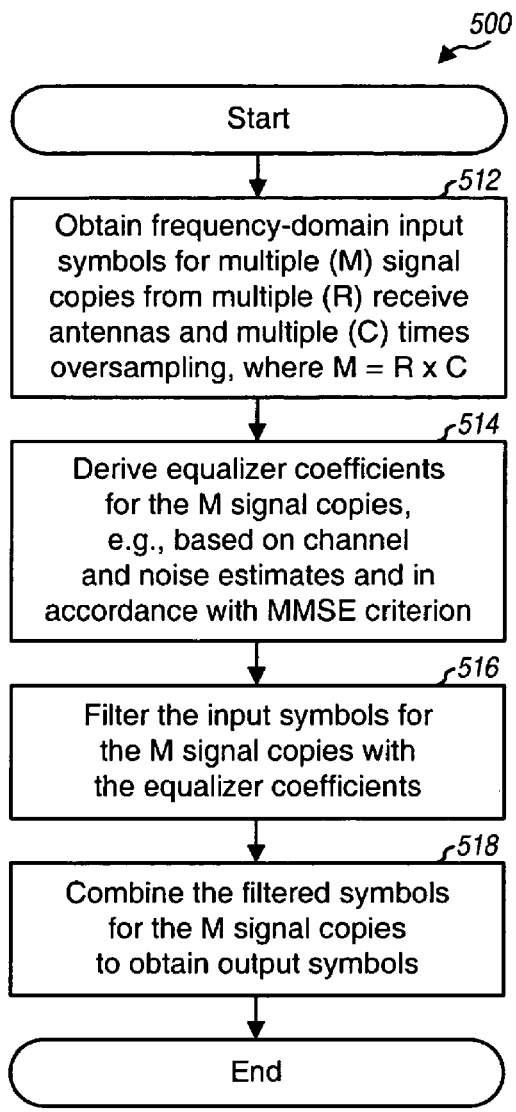
FIG. 5 shows a process to perform space-frequency equalization.

FIG. 5 shows a process 500 for performing space-frequency equalization. Frequency-domain input symbols are obtained for multiple (M) signal copies from multiple (R) receive antennas and multiple (C) times oversampling, or C signal copies from each receive antenna, where M=R·C (block 512). The input symbols for the M signal copies may be obtained by (1) receiving time-domain input samples at C times chip rate for each receive antenna and (2) transforming the input samples for each receive antenna to the frequency domain to obtain input symbols for the C signal copies for the receive antenna.

Equalizer coefficients for the M signal copies are derived, e.g., based on channel and noise estimates and in accordance with the MMSE criterion (block 514). The input symbols for the M signal copies are filtered with the equalizer coefficients (block 516). The filtered symbols for the M signal copies are combined to obtain output symbols (block 518). M signal components in frequency bin k for the M signal copies may be combined, where k is an index for the K/C frequency bins in each signal copy.

If one data stream is being recovered for a SIMO transmission, then one set of equalizer coefficients $W_{r,c}^*(k)$ may be derived for each signal copy. For example, if C=2 and R=2, then four sets of equalizer coefficients $W_{1,L}^*(k)$, $W_{1,U}^*(k)$, $W_{2,L}^*(k)$ and $W_{2,U}^*(k)$ may be derived for four signal copies. For the embodiments described above, each set includes K/2 equalizer coefficients for K/2 frequency bins in one signal copy. A vector of M equalizer coefficients, $\underline{w}^H(k)$, may be formed for each frequency bin k with M equalizer coefficients for frequency bin k. The equalizer coefficients may be derived based on an assumption of (1) spectrally uncorrelated noise for the C signal copies from each receive antenna, (2) spatially uncorrelated noise for the R receive antennas, or (3) spatially and spectrally uncorrelated noise for the M signal copies. The computation for the equalizer coefficients may be simplified with any of the noise assumptions, as described above.

If multiple (T) data streams are being recovered for a MIMO transmission, then M sets of equalizer coefficients may be derived for the M signal copies for each data stream. For each frequency bin k, a noise and interference covariance matrix $\underline{\Psi}_t(k)$ may be determined for each data stream and used to derive the equalizer coefficients $\underline{w}_t^H(k)$ for that data stream. Alternatively, for each frequency bin k, a common noise and interference covariance matrix $\underline{\Psi}(k)$ may be determined, and the equalizer coefficients for all T data streams may be derived based on this common noise and interference covariance matrix. The input symbols for the M signal copies may be filtered with the M sets of equalizer coefficients for each data stream to obtain filtered symbols for the M signal copies for the data stream. The filtered symbols for the M signal copies for each data stream may be combined to obtain output symbols for the data stream.

In practice, even when C is greater than 2, the receiver typically does not have to combine all M=C·R signal components since in most cases only 2R out of M signal components have non-negligible signal energy. All of the other redundant components are typically suppressed by the stop-band of the transmitter filters and the receiver front-end filters. Therefore, the practical dimension of the space-frequency equalizer or the covariance matrix remains 2R even when C>2.

Figure 6:
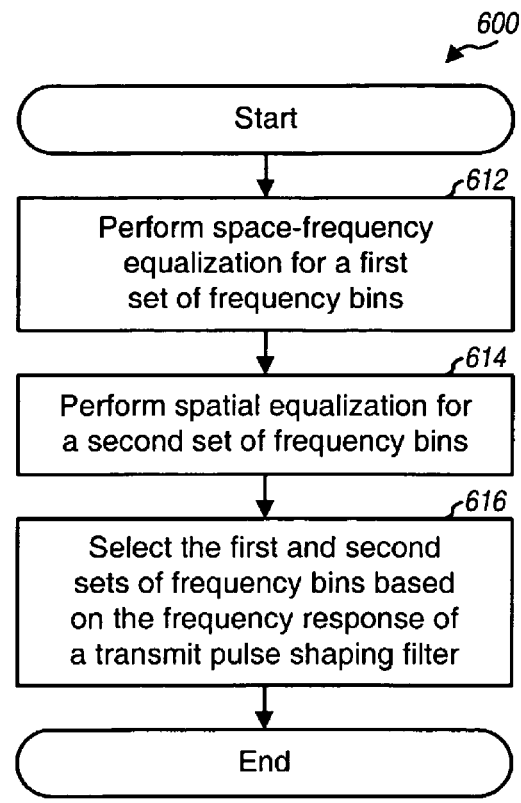
FIG. 6 shows a process to perform equalization with a combination of space-frequency equalizers and spatial equalizers.

FIG. 6 shows a process 600 for performing equalization with a combination of space-frequency equalizers and spatial equalizers. Space-frequency equalization is performed for a first set of frequency bins, e.g., frequency bins $K_A+1$ through $K_B$ in FIG. 4B (block 612). The space-frequency equalization combines signal components across spatial and frequency dimensions. Spatial equalization is performed for a second set of frequency bins, e.g., frequency bins 1 through $K_A$ and frequency bins $K_B+1$ through K/2 in FIG. 4B (block 614). The spatial equalization combines signal components across spatial dimension. The first and second sets of frequency bins may be selected based on the frequency response of the transmit pulse shaping filter, a tradeoff between complexity and performance, and so on (block 616).

Figure 7:
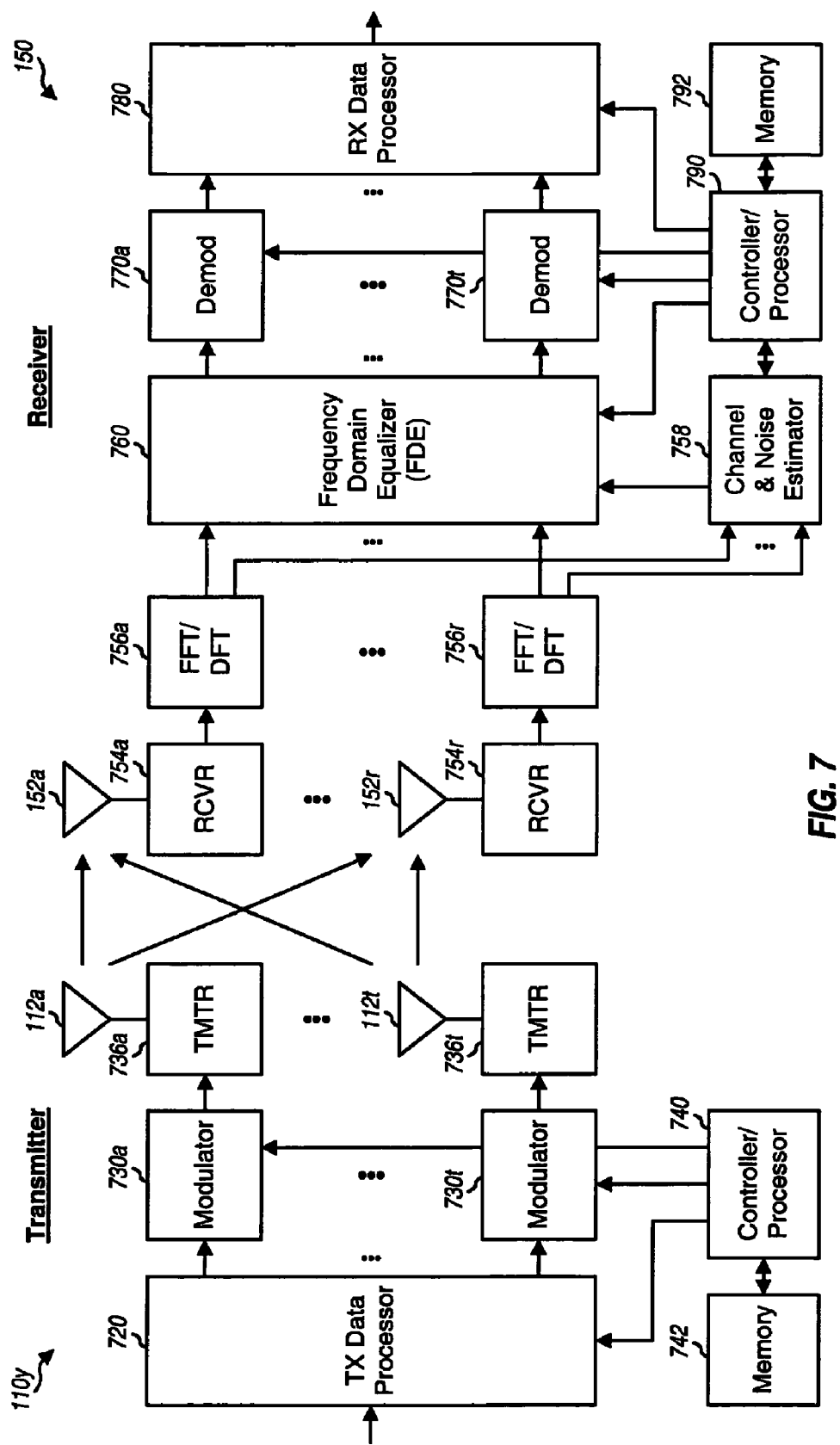
FIG. 7 shows a block diagram of a multi-antenna transmitter and the receiver.

FIG. 7 shows a block diagram of transmitter 110y and receiver 150 in system 100 in FIG. 1. For a downlink/forward link transmission, transmitter 110y is part of a base station, and receiver 150 is part of a wireless device. For an uplink/reverse link transmission, transmitter 110y is part of a wireless device, and receiver 150 is part of a base station. A base station is typically a fixed station that communicates with the wireless devices and may also be called a Node B, an access point, and so on. A wireless device may be fixed or mobile and may also be called a user equipment (UE), a mobile station, a user terminal, a subscriber unit, and so on. A wireless device may be a cellular phone, a personal digital assistant (PDA), a wireless modem card, or some other device or apparatus.

At transmitter 110y, a transmit (TX) data processor 720 processes (e.g., encodes, interleaves, and symbol maps) traffic data and provides data symbols to T modulators 730a through 730t. As used herein, a data symbol is a modulation symbol for data, a pilot symbol is a modulation symbol for pilot, a modulation symbol is a complex value for a point in a signal constellation (e.g., for M-PSK or M-QAM), and pilot is data that is known a priori by both the transmitter and receiver. Each modulator 730 processes its data symbols and pilot symbols in the manner specified by the system and provides transmit chips $x_t(n)$ to an associated transmitter unit (TMTR) 736. Each transmitter unit 736 processes (e.g., converts to analog, amplifies, filters, and frequency upconverts) its transmit chips and generates a modulated signal. T modulated signals from T transmitter units 736a through 736t are transmitted from T antennas 112a through 112t, respectively.

At receiver 150, R antennas 152a through 152r receive the transmitted signals via various signal paths and provide R received signals to R receiver units (RCVR) 754a through 754r, respectively. Each receiver unit 754 conditions (e.g., filters, amplifies, and frequency downconverts) its received signal, digitizes the conditioned signal at multiple times (e.g., twice) the chip rate, and provides time-domain input samples to an associated FFT/DFT unit 756. Each unit 756 transforms the input samples to the frequency domain and provides frequency-domain input symbols $R_r(k)$.

A channel and noise estimator 758 may estimate the channel response vectors and the noise based on the frequency-domain input symbols from FFT/DFT units 756 (as shown in FIG. 7) and/or the time-domain input samples from receiver units 754 (not shown in FIG. 7). Channel and noise estimation may be performed in various manners known in the art. A frequency domain equalizer (FDE) 760 derives equalizer coefficients based on the channel response vectors and the noise estimates, filters the input symbols with the equalizer coefficients, combines the filtered symbols across space and frequency or just space, and provides output symbols to T demodulators (Demod) 770a through 770t. Each demodulator 770 may perform FFT/IDFT on the output symbols from FDE 760 if transmitter 110 sends modulation symbols in the time domain, e.g., for CDMA, TDMA, and SC-FDMA. Each demodulator 770 then processes its (frequency or time-domain) output symbols in a manner complementary to the processing by modulator 730 and provides data symbol estimates. A receive (RX) data processor 780 processes (e.g., symbol demaps, deinterleaves, and decodes) the data symbol estimates and provides decoded data. In general, the processing by demodulators 770 and RX data processor 780 is complementary to the processing by modulators 730 and TX data processor 720, respectively, at transmitter 110y.

Controllers/processors 740 and 790 direct operation of various processing units at transmitter 110y and receiver 150, respectively. Memories 742 and 792 store data and program codes for transmitter 110y and receiver 150, respectively.

The equalization techniques described herein may be used for various communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single-Carrier FDMA (SC-FDMA) systems, and so on. A CDMA system may implement one or more radio technologies such as Wideband-CDMA (W-CDMA), cdma2000, and so on. cdma2000 covers IS-2000, IS-856, and IS-95 standards. A TDMA system may implement a radio technology such as Global System for Mobile Communications (GSM). These various radio technologies and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. An OFDMA system transmits modulation symbols in the frequency domain on orthogonal frequency subbands using orthogonal frequency division multiplexing (OFDM). An SC-FDMA system transmits modulation symbols in the time domain on orthogonal frequency subbands.

Modulators 730 at transmitter 110y and demodulators 770 at receiver 150 perform processing as specified by the system. For example, modulators 720 may perform processing for CDMA, OFDM, SC-FDMA, and so on, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to implement at least one space-frequency equalizer, each space-frequency equalizer combining signal components across spatial and frequency dimensions, and to implement at least one spatial equalizer, each spatial equalizer combining signal components across spatial dimension, wherein the at least one processor implements a set of space-frequency equalizers for a first set of frequency bins in a received signal and implements a set of spatial equalizers for a different second set of frequency bins in the received signal; and
a memory coupled to the at least one processor.

2. The apparatus of claim 1, wherein the first and second sets of frequency bins are determined based on a frequency response of a transmit pulse shaping filter.

3. The apparatus of claim 1, wherein the at least one processor derives coefficients for the at least one space-frequency equalizer and the at least one spatial equalizer based on minimum mean square error (MMSE) criterion.

4. A method comprising:
combining signal components across spatial and frequency dimensions for at least a first frequency bin $k_1$ of a given copy of a received signal; and
combining signal components across spatial dimension for at least a disparate second frequency bin $k_2$ of the given copy of the received signal,
where $k_1$ and $k_2$ are indexes for frequency bins.

5. The method of claim 4, wherein the combining the signal components across the spatial and frequency dimensions comprises deriving equalizer coefficients based on minimum mean square error (MMSE) criterion, and filtering input symbols for multiple signal copies with the equalizer coefficients.

6. An apparatus comprising:
means for combining signal components across spatial and frequency dimensions for at least a first frequency bin $k_1$ of a given copy of a received signal; and
means for combining signal components across spatial dimension for at least a disparate second frequency bin $k_2$ of the given copy of the received signal,
where $k_1$ and $k_2$ are indexes for frequency bins.

7. The apparatus of claim 6, wherein the means for combining the signal components across the spatial and frequency dimensions comprises:
means for deriving equalizer coefficients based on minimum mean square error (MMSE) criterion, and
means for filtering input symbols for multiple signal copies with the equalizer coefficients.

8. The apparatus of claim 1, wherein the at least one processor is operative to process multiple-input multiple-output (MIMO) signals.

9. The method of claim 4, further comprising:
receiving multiple-input multiple-output (MIMO) signal components.

10. The apparatus of claim 6, further comprising:
means for receiving multiple-input multiple-output (MIMO) signal components.

11. The method of claim 4, further comprising:
obtaining input samples from the received signal at twice the received signal's chip rate;
transforming the input samples to frequency domain using a K-point Fourier transform to yield a lower copy of the received signal's spectrum and an upper copy of the received signal's spectrum, wherein the lower copy comprises frequency bin indices 1 through K/2, and the upper copy comprises frequency bin indices K/2+1 through K, where K is an integer greater than or equal to 1.

12. The method of claim 11, further comprising:
selecting as the first frequency bin $k_1$ a frequency bin for which there are non-negligible signal components on both frequency bin $k_1$ in the lower copy and frequency bin $k_1$+K/2 on the upper copy; and
selecting as the disparate second frequency bin $k_2$ a frequency bin for which there are non-negligible signal components on only one of either frequency bin $k_2$ on the lower copy or frequency bin $k_2$+K/2 on the upper copy.

13. The apparatus of claim 6, further comprising:
means for obtaining input samples from the received signal at twice the received signal's chip rate; and
means for transforming the input samples to frequency domain using a K-point Fourier transform to yield a lower copy of the received signal's spectrum and an upper copy of the received signal's spectrum, wherein the lower copy comprises frequency bin indices 1 through K/2, and the upper copy comprises frequency bin indices K/2+1 through K, where K is an integer equal to or greater than one.

14. The apparatus of claim 13, further comprising:
means for selecting as the first frequency bin $k_1$ a frequency bin for which there are non-negligible signal components on both frequency bin $k_1$ in the lower copy and frequency bin $k_1$+K/2 on the upper copy; and
means for selecting as the disparate second frequency bin $k_2$ a frequency bin for which there are non-negligible signal components on only one of either frequency bin $k_2$ on the lower copy or frequency bin $k_2$+K/2 on the upper copy.

15. An apparatus comprising:
at least one processor configured to derive equalizer coefficients for multiple signal copies obtained via multiple receive antennas and oversampling, and to filter input symbols for the multiple signal copies with the equalizer coefficients, wherein the at least one processor derives at least one space-frequency equalizer for a first set of frequency bins in at least one of the multiple signal copies and derives at least one spatial equalizer for a different second set of frequency bins in the at least one of the multiple signal copies; and
a memory coupled to the at least one processor.

16. The apparatus of claim 15, wherein the at least one processor derives the equalizer coefficients based on minimum mean square error (MMSE) criterion.

17. The apparatus of claim 15, wherein the at least one processor filters the input symbols in frequency domain with the equalizer coefficients.

18. The apparatus of claim 15, wherein the at least one processor combines filtered symbols for the multiple signal copies across space and frequency dimensions.

19. An apparatus comprising:
a computer-readable medium having stored thereon computer-executable instructions executable by a processor to:
derive equalizer coefficients for multiple signal copies obtained via multiple receive antennas and oversampling, the deriving comprising at least:
deriving a space-frequency equalizer coefficient for a first subset of frequency bins in at least one of the multiple signal copies; and
deriving a spatial equalizer coefficient for a disparate second subset of frequency bins in the at least one of the multiple signal copies; and
filtering input symbols for the multiple signal copies with the equalizer coefficients.

20. The apparatus of claim 19, wherein the filtering the input symbols comprises filtering the input symbols in frequency domain with the equalizer coefficients.

21. The apparatus of claim 19, wherein the filtering the input symbols comprises combining filtered symbols for the multiple signal copies across space and frequency dimensions.

22. An apparatus comprising:
means for deriving equalizer coefficients for multiple signal copies obtained via multiple receive antennas and oversampling, the means for deriving comprising at least means for deriving a space-frequency equalizer coefficient for a first subset of frequency bins in at least one of the multiple signal copies and means for deriving a spatial equalizer coefficient for a disparate second subset of frequency bins in the at least one of the multiple signal copies; and
means for filtering input symbols for the multiple signal copies with the equalizer coefficients.

23. The apparatus of claim 22, wherein the means for filtering the input symbols comprises means for filtering the input symbols in frequency domain with the equalizer coefficients.

24. The apparatus of claim 22, wherein the means for filtering the input symbols comprises means for combining filtered symbols for the multiple signal copies across space and frequency dimensions.

25. An apparatus comprising:
at least one processor configured to obtain input symbols for multiple (M) signal copies from multiple (R) receive antennas and multiple (C) times oversampling, where M is equal to R times C, to derive equalizer coefficients for the M signal copies, to filter the input symbols for the M signal copies with the equalizer coefficients, and to combine filtered symbols for the M signal copies, wherein R, C, and M are integers greater than one; and
a memory coupled to the at least one processor,
wherein the at least one processor derives M sets of equalizer coefficients for the respective M signal copies for each of at least one data stream, the M sets of equalizer coefficients including at least one set comprising a space-frequency equalizer coefficient used to filter a first subset of frequency bins in at least one of the M signal copies and a spatial equalizer coefficient used to filter a different second subset of frequency bins in the at least one of the M signal copies.

26. The apparatus of claim 25, wherein the at least one processor receives input samples at C times chip rate for each of the multiple receive antennas and transforms the input samples for each of the multiple receive antennas to frequency domain to obtain input symbols for M signal copies from the respective receive antennas.

27. The apparatus of claim 25, wherein R is equal to two and C is equal to two, and wherein the at least one processor derives four sets of equalizer coefficients for four signal copies, each set of equalizer coefficients being for one of the M signal copies.

28. The apparatus of claim 25, wherein the at least one processor combines signal components on frequency bin k for the M signal copies, where k is a frequency bin index.

29. The apparatus of claim 25, wherein the at least one processor derives the equalizer coefficients based on minimum mean square error (MMSE) criterion.

30. The apparatus of claim 25, wherein the at least one processor derives the equalizer coefficients based on an assumption of uncorrelated noise for M signal copies from each of the multiple receive antennas.

31. The apparatus of claim 25, wherein the at least one processor derives the equalizer coefficients based on an assumption of uncorrelated noise for the R receive antennas.

32. The apparatus of claim 25, wherein the at least one processor derives the equalizer coefficients based on an assumption of spatially and spectrally uncorrelated noise for the M signal copies.

33. The apparatus of claim 25, wherein for each of multiple (T) data streams to be recovered, the at least one processor derives equalizer coefficients for the M signal copies for the data stream, filters the input symbols for the M signal copies with the equalizer coefficients to obtain filtered symbols for the M signal copies, and combines the filtered symbols for the M signal copies to obtain output symbols for the data stream, where T is an integer greater than one.

34. The apparatus of claim 33, wherein for each of the T data streams the at least one processor derives noise and interference covariance matrices and derives the equalizer coefficients for the data stream based on the noise and interference covariance matrices.

35. The apparatus of claim 33, wherein for each of multiple frequency bins the at least one processor derives a common noise and interference covariance matrix and derives the equalizer coefficients for each of the T data streams based on the common noise and interference covariance matrix.

36. A method comprising:
obtaining input symbols for multiple (M) signal copies from multiple (R) receive antennas and multiple (C) times oversampling, where M is equal to R times C;
deriving equalizer coefficients for the M signal copies;
filtering the input symbols for the M signal copies with the equalizer coefficients to yield filtered signals, the filtering comprising at least filtering a first subset of frequency bins in at least one of the M signal copies using a space-frequency equalizer coefficient, and filtering a different second subset of frequency bins in the at least one of the M signal copies using a spatial equalizer coefficient; and
combining the filtered symbols for the M signal copies, where M, R, and C are integers greater than one.

37. The method of claim 36, wherein the combining the filtered symbols comprises combining signal components on frequency bin k for the M signal copies, where k is a frequency bin index.

38. The method of claim 36, wherein the deriving the equalizer coefficients comprises deriving the equalizer coefficients based on an assumption of uncorrelated noise for M signal copies from each receive antenna.

39. The method of claim 36, wherein the deriving the equalizer coefficients comprises deriving the equalizer coefficients based on an assumption of spatially and spectrally uncorrelated noise for the M signal copies.

40. The method of claim 36, wherein the deriving the equalizer coefficients comprises deriving the equalizer coefficients for the M signal copies for each of at least one data stream, wherein the filtering the input symbols comprises filtering the input symbols for the M signal copies with the equalizer coefficients for each data stream to obtain filtered symbols for the M signal copies for the data stream, and wherein the combining the filtered symbols comprises combining the filtered symbols for the M signal copies for each data stream to obtain output symbols for the data stream.

* * * * *